United States Patent [19]
Fukui

[11] Patent Number: 5,074,275
[45] Date of Patent: Dec. 24, 1991

[54] SIGNAL GENERATOR AND AN ENGINE CONTROL APPARATUS USING THE SAME

[75] Inventor: Wataru Fukui, Himeji, Japan

[73] Assignee: Mitsubishi Denki Kabushiki Kaisha, Tokyo, Japan

[21] Appl. No.: 686,965

[22] Filed: Apr. 18, 1991

[30] Foreign Application Priority Data

Apr. 23, 1990 [JP] Japan .................................. 2-105464
May 17, 1990 [JP] Japan .................................. 2-125482

[51] Int. Cl.$^5$ ............................................. F02P 9/00
[52] U.S. Cl. ..................................... 123/613; 123/414
[58] Field of Search ............... 123/414, 613, 416, 417, 123/418, 612, 594, 618, 643

[56] References Cited

U.S. PATENT DOCUMENTS

| | | | |
|---|---|---|---|
| 4,531,190 | 7/1985 | Drews et al. | 364/431.11 |
| 4,787,355 | 11/1988 | Maeda | 123/414 |
| 4,817,574 | 4/1989 | Engel et al. | 123/414 |
| 4,869,221 | 9/1989 | Abe | 123/414 |
| 4,941,446 | 7/1990 | Denz et al. | 123/414 |
| 4,951,639 | 8/1990 | Iwata et al. | 123/613 |
| 4,960,092 | 10/1990 | Sasaki et al. | 123/414 |
| 4,979,485 | 12/1990 | Iwata et al. | 123/613 |
| 5,010,864 | 4/1991 | Matsuoka et al. | 123/414 |

Primary Examiner—Raymond A. Nelli
Attorney, Agent, or Firm—Sughrue, Mion, Zinn, Macpeak & Seas

[57] ABSTRACT

A signal generator generates a crank angle reference signal containing a plurality of pulses for one ignition cycle of each cylinder which correspond to prescribed crank positions, respectively, of a corresponding cylinder. The operation of an engine is controlled on the crank angle reference signal so that reference crank positions for engine control are able to be switched over between the pulses depending upon changes in the operating condition of the engine, thereby improving the reliability and stability in the engine control. In addition, a reference position for engine control can be set as near as possible to a control timing, at which an engine control operation such as ignition, fuel injection, etc., is performed, by using an appropriate one(s) of the rising and falling edges of the pulses contained in the crank angle reference signal.

10 Claims, 5 Drawing Sheets

(a)~(d): TIMING CONTROL RANGES

SIGNAL GENERATOR AND AN ENGINE CONTROL APPARATUS USING THE SAME

BACKGROUND OF THE INVENTION

The present invention relates to a signal generator which generates, in synchrony with the rotation of an engine, a crank angle reference signal containing a plurality of pulses representative of reference crank positions of cylinders. It also relates to an engine control apparatus using such a signal generator in which a plurality of cylinders of an engine are controlled on the basis of the plurality of pulses contained in the crank angle reference signal generated by the signal generator. More particularly, it relates to such an engine control apparatus which is able to improve the reliability in control by changing the reference crank positions in a practical control range in accordance with changes in the operating conditions of the engine.

In order for a multi-cylinder internal combustion engine such as used in automobiles to properly operate, fuel injection, ignition and the like for each cylinder must take place at prescribed rotational positions or angles of the crankshaft of the engine, i.e., at times when each piston of the engine is at a prescribed position with respect to top dead center. For this reason, an engine is equipped with a rotational position sensor such as a signal generator which senses the rotational angle or position of the crankshaft of the engine.

FIG. 5 illustrates, in a block diagram, a conventional control apparatus for a multi-cylinder internal combustion engine. The engine control apparatus includes a signal generator 8 which generates a positional signal L including a plurality of positional pulses corresponding to the respective cylinders of the engine, an interface circuit 9, and a control unit 10 in the form of a microcomputer which receives the positional signal L from the signal generator 8 through the interface circuit 9 and recognizes, based thereon, the operating condition (i.e., crank angle or rotational position) of each cylinder.

A typical example of such a signal generator 8 is illustrated in FIG. 6. In this figure, the signal generator 8 illustrated includes a rotating plate 2 mounted on a rotating shaft 1 (such as the distributor shaft) which rotates in synchrony with the crankshaft of the engine. The rotating plate 2 has a set of first slits 3a formed in it at prescribed locations. The slits 3a are disposed at equal intervals in the circumferential direction of the rotating plate 2. The slits 3a, which are equal in number to the cylinders, are disposed so as to correspond to prescribed rotational angles of the crankshaft and thus to prescribed positions of each piston with respect to top dead center for sensing when the crankshaft reaches a prescribed rotational position for each cylinder. Another or second slit 3b is formed in the rotating plate 2 adjacent one of the first slits 3a at a location radially inwardly thereof for sensing when the crankshaft rotational angle is such that the piston of a specific reference cylinder is in a prescribed position.

A first and a second light emitting diode 4a, 4b are disposed on one side of the rotating plate 2 on a first outer circle and a second inner circle, respectively, on which the outer slits 3a and the inner slits 3b are respectively disposed. A first and a second light sensor 5a, 5b each in the form of a photodiode are disposed on the other side of the rotating plate 2 in alignment with the first and the second light emitting diode 4a, 4b, respectively. The first light sensor 5a generates an output signal each time one of the outer slits 3a passes between the first light sensor 5a and the first light emitting diode 4a. Also, the second light sensor 5b generates an output signal each time the inner slit 3b passes between the second light sensor 5b and the second light emitting diode 4b. As shown in FIG. 7, the outputs of the first and second light sensors 5a, 5b are input to the input terminals of corresponding amplifiers 6a, 6b each of which has the output terminal coupled to the base of a corresponding output transistor 7a or 7b which has the open collector coupled to the interface circuit 9 (FIG. 5) and the emitter grounded.

Now, the operation of the above-described conventional engine control apparatus as illustrated in FIGS. 4 through 6 will be described in detail with particular reference to FIG. 8 which illustrates the waveforms of the output signals of the first and second light sensors 5a, 5b.

As the engine is operated to run, the rotating shaft 1 operatively connected with the crankshaft (not shown) is rotated together with the rotating plate 2 fixedly mounted thereon so that the first and second light sensors 5a, 5b of the signal generator 8 generate a first and a second signal $L_1$, $L_2$ each in the form of a square pulse. The first signal $L_1$ is a crank angle signal called an SGT signal and has a rising edge corresponding to the leading edge of one of the outer slits 3a (i.e., a first prescribed crank angle or position of a corresponding piston) and a falling edge corresponding to the trailing edge thereof (i.e., a second prescribed crank angle of the corresponding piston). In the illustrated example, each square pulse of the SGT signal $L_1$ rises at a crank angle of 75 degrees before top dead center (a first reference position B75) of each piston, and falls at a crank angle of 5 degrees before top dead center (a second reference position B5).

The second signal $L_2$ is a cylinder recognition signal called an SGC signal, and has a rising edge corresponding to the leading edge of the inner slit 3b and a falling edge corresponding to the trailing edge thereof. The SGC signal $L_2$ is issued substantially simultaneously with the issuance of an SGT signal pulse corresponding to the specific reference cylinder #1 so as to identify the same. To this end, the inner slit 3b is designed such that it has a leading edge corresponding to a crank angle before the first reference angle of the corresponding SGT signal pulse (i.e., a crank angle greater than 75 degrees before TDC), and a trailing edge corresponding to a crank angle after the second reference angle of the corresponding SGT signal pulse (i.e., a crank angle smaller than 5 degrees before TDC). Thus, actually, the rising edge of an SGC signal pulse occurs before that of a corresponding SGT signal pulse, and the falling edge of the SGC signal pulse occurs after that of the corresponding SGT signal pulse.

The two kinds of first and second signals $L_1$, $L_2$ thus obtained are input via the interface circuit 9 to the microcomputer 10 which identifies the specific reference cylinder #1 based on the second signal $L_2$, and the operational positions (i.e., crank angles or rotational positions) of the remaining cylinders #2 through #4 based on the first signal $L_1$, whereby various operational calculations and engine control operations such as for controlling ignition timing, fuel injection timing, etc., are properly performed. For example, the power supply to an unillustrated ignition coil is started by a timer after the lapse of a first predetermined time from the rising edge of a pulse of the first signal $L_1$ (i.e., the reference position of 75 degrees before top dead center), and then it is cut off after the lapse of a second predetermined time therefrom. In this case, however, as the number of revolutions per minute of the engine increases, the ignition timing or power supply cut-off timing are advanced toward the reference position (i.e., 75 degrees BTDC) so that the length of time from the start of the power supply to the cut-off thereof decreases. Therefore, it is desirous that the reference position for control also be properly advanced from the crank angle reference position or the rising edge of a pulse of the first signal. To this end, each of the slits $3a$ in the rotary disk 2 must have an extended circumferential length, which, however, reduces the mechanical strength of the rotary disk 2. Moreover, the power supply to the ignition coil during a bypass ignition period (i.e., during early stages of an engine starting operation) is started at the first reference crank position or the rising edge of a first signal pulse (i.e., at 75 degrees BTDC), and it is cut off at the second reference crank position or the falling edge of the first signal pulse (i.e., at 5 degrees BTDC). Under this condition, if the first reference position for starting the power supply is set to a crank position advanced from 75 degrees BTDC so as to be able to increase the power supply time during high-speed operation of the engine, power consumption increases and great heat is generated at the ignition coil and its related elements during a bypass ignition period, thus posing the problem of thermal damage thereto. Consequently, the above measure is not a practical solution.

With the above-described conventional engine control apparatus, the signal generator 8 generates a crank angle reference signal $L_1$ which contains only one pulse for one ignition cycle of each cylinder, so the reference crank position for engine control is fixed. As a result, even when the rotational speed of the engine increases during normal engine control, the reference crank position for engine control can not be advanced from the fixed first reference crank position or the rising edge of a first signal pulse (i.e., 75 degrees BTDC). Therefore, the conventional apparatus is not suitable for the high-speed operation of the engine. On the other hand, in order to meet high rotational speeds of the engine, the first reference crank position or the rising edge of a pulse of the crank angle reference signal $L_1$ has to be set at a certain advanced location. This, however, results in an extended control time such as an extended power supply time during bypass ignition periods. Thus, as referred to above, power consumption increases, generating a large amount of heat. To avoid the resultant thermal destruction of related elements, a heat sink or like heat-absorbing or heat-dissipating means is additionally required. This increases the number of component parts required and makes the overall construction of the apparatus complicated, adding to the costs of manufacture. In addition, the extended control period or duration such as the power supply time results in increased adverse effects on stable engine control due to external disturbances such as sudden variations in the rotational speed of the engine.

SUMMARY OF THE INVENTION

Accordingly, the present invention is intended to obviate the above-described problems as encountered with the conventional engine control apparatus.

An object of the present invention is to provide a novel and improved signal generator for use with an engine control apparatus which generates a crank angle reference signal containing a plurality of pulses for one ignition cycle of a cylinder which correspond to prescribed crank positions of the cylinder, without reducing the mechanical strength of the generator to any substantial extent.

Another object of the present invention is to provide a novel and improved engine control apparatus in which a reference crank position for engine control can be changed in accordance with the operating conditions of the engine such as the rotational speed thereof so that the reference crank position can be properly retarded for a low-speed operation or bypass ignition period, and advanced during a high-speed operation of the engine.

A further object of the present invention is to provide a novel and improved engine control apparatus which can change a reference crank position for engine control in accordance with different timing control ranges, thereby improving reliability and stability in engine control.

In order to achieve the above objects, according to one aspect of the present invention, there is provided a signal generator for use with an engine control apparatus which generates a crank angle reference signal containing a plurality of pulses for each operation cycle of each cylinder in synchrony with the rotation of the engine, each of the pulses in a group having a rising edge and a falling edge which can be used as predetermined reference crank positions of a corresponding cylinder for controlling the operation of the engine.

According to another object of the present invention, there is provided a signal generator for use with an engine control apparatus comprising:

a rotating shaft being rotatable in synchrony with the rotation of an engine;

a rotating disk fixedly mounted on the rotating shaft and having a plurality of groups of slits formed therein, the slits in a group being for a corresponding one of the cylinders and being disposed on a circle around the axis of the rotating shaft, each of the slits in a group having a leading edge and a trailing edge corresponding to prescribed crank positions of a corresponding one of the cylinders; and a photocoupler disposed near the rotating disk for generating an output signal when it senses that one of the slits in the rotating disk passes a prescribed location during the rotation of the rotating disk.

In one embodiment, each group of the slits comprises at least a first slit and a second slit disposed on a single circle around the axis of the rotating shaft, the first slits having substantially the same circumferential length and being circumferentially spaced from each other at substantially the same interval, the second slits being disposed near the corresponding first slits and having substantially the same circumferential length and being circumferentially spaced from each other at substantially the same interval.

According to a further aspect of the present invention, there is provided a control apparatus for an internal combustion engine comprising:

a signal generator for generating a crank angle reference signal containing a plurality of pulses for each operation cycle of each cylinder in synchrony with the rotation of the engine, each of the pulses in a group having a rising edge and a falling edge which correspond to predetermined reference crank positions of a corresponding cylinder; and a control unit for controlling the operation of the engine based on the crank angle reference signal of the signal generator in such a manner that it controls the engine based on some of the rising and falling edges of the pulses in each group in one operating condition of the engine, and based on another of the rising and falling edges of the pulses in each group in another operating condition of the engine.

According to a yet further aspect of the present invention, there is provided a control apparatus for an internal combustion engine comprising:

a signal generator for generating a crank angle reference signal containing a plurality of pulses for each operation cycle of each cylinder in synchrony with the rotation of the engine, each of the pulses in a group having a rising edge and a falling edge which correspond to predetermined reference crank positions of a corresponding cylinder; and a control unit for controlling the operation of the engine based on the crank angle reference signal of the signal generator in such a manner that at least one of the rising and falling edges of the pulses in a group is set as a reference control position in accordance with different timing control ranges.

Preferably, the at least one of the rising and falling edges of the pulses set as a reference control position is the nearest to a control timing at which control of the engine is performed.

The above and other objects, features and advantages of the present invention will become more readily apparent from the ensuing detailed description of a preferred embodiment of the invention taken in conjunction with the accompanying drawings.

DESCRIPTION OF THE PREFERRED EMBODIMENT

The present invention will now be described in detail with reference to a preferred embodiment as illustrated in the accompanying drawings.

Figure 5:
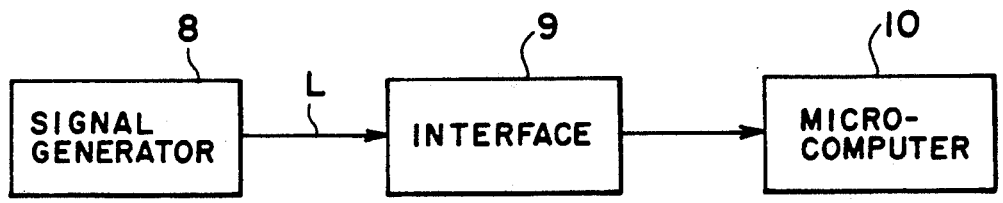
FIG. 5 is a schematic block diagram of a conventional engine control apparatus.

First, it should be understood that the general arrangement of an engine control apparatus according to the present invention is similar to that of the conventional one illustrated in FIG. 5. However, the construction and operation of a signal generator, which is generally designated by reference numeral 108 in FIG. 1, and the operation of a control unit (not shown) in the form of a microcomputer are different from the corresponding elements 8, 10 of the conventional apparatus as illustrated in FIGS. 5 and 6.

Specifically, the signal generator 108 of the invention generates a crank angle reference signal containing two pulses for one ignition cycle of each cylinder in synchrony with the rotation of the engine, each of the two pulses having a rising edge and a falling edge which can be used as prescribed reference crank positions for a corresponding cylinder for controlling the operation of the engine. The control unit of the invention controls the operation of the engine based on the crank angle reference signal of the signal generator 108 in such a manner that it controls the engine based on some of the rising and falling edges of the two pulses in one operating condition of the engine, and based on another of the rising and falling edges of the two pulses in another operating condition of engine. The signal generator 108 further generates a cylinder identification signal in synchrony with the rotation of the engine for identifying the cylinders of the engine, and the control unit identifies the operating states of the cylinders based on the cylinder identification signal, and controls the engine based on the crank angle reference signal in the above manner after the cylinder identification has been performed.

Figure 1:
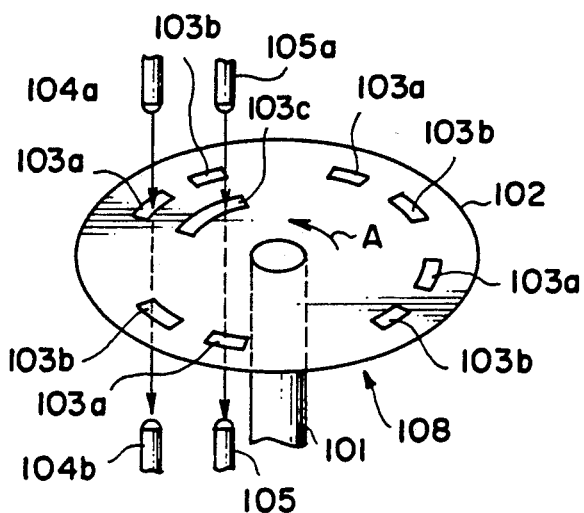
FIG. 1 is a perspective view schematically illustrating the arrangement of a signal generator according to the present invention.
Figure 6:
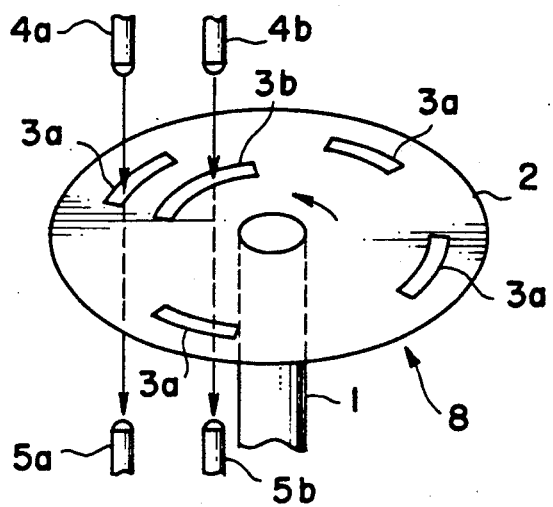
FIG. 6 is a perspective view illustrating the general arrangement of a conventional signal generator employed by the engine control apparatus of FIG. 5.

More specifically, as shown in FIG. 1, the signal generator 108 of the present invention includes a rotating shaft 101 operatively connected with the crankshaft (not shown) of a multi-cylinder internal combustion engine, and a rotating disk 102 fixedly mounted on the rotating shaft 101, as in the conventional signal generator 8 of FIG. 6. The rotating disk 102 has a plurality (four in the illustrated embodiment for a four-cylinder internal combustion engine) of pairs of first and second arcuate slits 103a, 103b formed therein. The first and second slits 103a, 103b are disposed on a circle around the axis of the rotating shaft 101. The first slits 103a have substantially the same circumferential length and are circumferentially spaced from each other at substantially the same intervals. The second slits 103b are disposed near the corresponding first slits 103a and have substantially the same circumferential lengths. The second slits 103b are circumferentially spaced from each other at substantially the same intervals, each of the first and second slits 103a, 103b in pairs having a leading or rising edge and a trailing or falling edge corresponding to prescribed crank positions of a corresponding one of the cylinders. In the illustrated example, the second slits 103b are circumferentially spaced a prescribed limited distance from the corresponding first slits 103a in a direction opposite the rotating direction of the rotating shaft 101 which is indicated by curved arrow A in FIG. 1. In FIG. 1, the second slits 103b are illustrated as having a circumferential length equal to that of the first slits 103a, but the circumferential length thereof may be less or greater than that of the first slits 103a as needed.

The rotating disk 102 also has a third arcuate slit 103c corresponding to a specific one of the cylinders and disposed near one of the first slits 103a on a circle different from the one on which the first and second slits 103a, 103b are disposed. In the illustrated example, the third slit 103c is disposed near the first slit 103a for the specific cylinder radially inside thereof, and has a central angle included by the circumferentially opposite ends thereof greater than that of the first slit 103a. Thus, the third slit 103c can be formed much smaller in its circumferential length than the second slit 3b of the aforementioned conventional signal generator 8 of FIG. 6 in spite of the fact that the circumferential length or central angle defined by the leading edge of a first slit 103a and the trailing edge of a corresponding second slit 103b in pair is greater than that of a first slit 3b of the conventional signal generator 8. Although in the illustration of FIG. 1, the third slit 103c is disposed inwardly of the first and second slits 103a, 103b, it can be disposed outwardly of or on the circle on which the first and second slits 103a, 103b are disposed. In addition, the third slit 103c is not limited to the illustrated configuration and arrangement, but it can be arranged differently in other configurations. Also, two or more third slits can be provided for the purpose of expediting cylinder identification.

A first and second photocoupler 104, 105 are provided near the rotating disk 102 for generating an output signal in the form of a crank angle reference signal $L'_1$ and an output signal in the form of a cylinder indentification signal $L'_2$, respectively, when they sense that one of the first, second and third slits 103a, 103b and 103c in the rotating disk 102 passes a prescribed location during the rotation of the rotating disk 102. Each of the photocouplers 104, 105 includes a paired set of light emitting diode 104a, 105a and a light sensor 104b, 105b in the form of a phototransistor which are disposed on the oposite sides of the rotating disk 102 in alignment with each other on the circle on which the first and second slits 103a, 103b or the third slit 103c are disposed. The light sensor 104b generates a crank angle reference signal $L'_1$ which contains two pulses for each ignition cycle of each cylinder when it receives the light emitted from the light emitting diode 104a and which passed through the first or second slits 103a, 103b, i.e., at the time when one of the slits 103a, 103b is placed in alignment with the light emitting diode 104a and the light sensor 104b. The light sensor 105b generates a cylinder identification signal $L'_2$ which contains one pulse for each ignition cycle of only the specific cylinder when it receives the light emitted from the light emitting diode 105a and which passed through the third slits 103c, i.e., at the time when the third slit 103c is placed in alignment with the light emitting diode 105a and the light sensor 105b.

Figure 2:
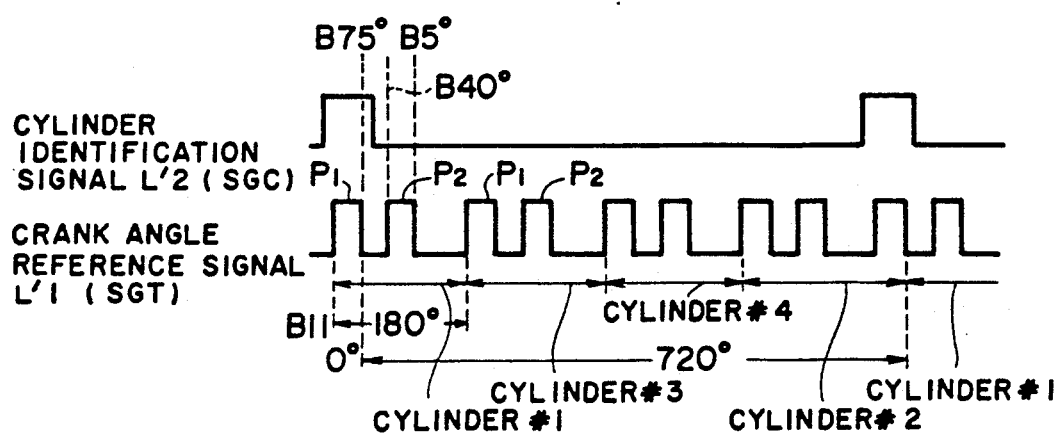
FIG. 2 is a waveform diagram showing the waveforms of the output signals of the signal generator of FIG. 1.

Thus, as illustrated in FIG. 2, the output signal $L'_1$ of the light sensor 104b contains a plurality of pairs of first and second pulses $P_1$, $P_2$ which have a relatively narrow pulse width and relate to a corresponding first slit 103a and a corresponding second slit 103b, respectively. Each of the first pulses $P_1$ has a rising edge, which occurs at the leading edge of a corresponding first slit 103a (e.g., at a crank angle of 110 degrees before top dead center (BTDC) for a corresponding cylinder), and a falling edge, which occurs at the trailing edge thereof (e.g., at 75 degrees BTDC for the corresponding cylinder). Also, each of the second pulses $P_2$ following a corresponding first pulse $P_1$ has a rising edge, which occurs at the leading edge of a corresponding second slit 103b (e.g., at 40 degrees BTDC) and a falling edge, which occurs at the trailing edge of the corresponding second slit 103b (e.g., at 5 degrees BTDC).

On the other hand, the output signal $L'_2$ of the light sensor 105b contains a single cylinder identification pulse for each ignition cycle of the specific cylinder. The cylinder identification pulse has, in the illustrated embodiment, a relatively wide pulse width and is out of phase with a first pulse $P_1$ of the crank angle reference signal $L'_1$. That is, the cylinder identification pulse rises before the leading or rising edge of the first pulse $P_1$, i.e., before 110 degrees BTDC and falls after the trailing or falling edge thereof and before the leading or rising edge of the following second pulse $P_2$, i.e., after 75 degrees BTDC and before 40 degrees BTDC.

In operation, as the rotating disk 102 rotates in the direction indicated by arrow A in FIG. 1 in synchrony with the rotation of the engine, the light sensors 104b, 105b of the signal generator 108 each generate a crank angle reference signal $L'_1$ containing first and second pulses $P_1$, $P_2$ and a cylinder identification signal $L'_2$ containing third pulses, as shown in FIG. 2. The output signals of the signal generator 108 is fed via the unillustrated interface circuit to the control unit (not shown) which identifies the specific cylinder as well as a first pulse $P_1$ corresponding thereto based on a cylinder identification pulse contained in the cylinder identification signal $L'_2$. Thereafter, based on the crank angle reference signal $L'_1$ (i.e., the rising and falling edges of first and second pulses $P_1$, $P_2$), the control unit recognizes the four reference crank positions, i.e., 110 degrees BTDC, 75 degrees BTDC, 40 degrees BTDC and 5 degrees BTDC, and controls the engine based on these reference crank positions.

For example, during normal (low-speed and medium-speed) operation of the engine, the first reference crank position of 75 degrees BTDC is taken as a control reference, whereas in high-speed operation of the engine, the third reference crank position of 110 degrees BTDC is taken as a control reference. As a result, for high-speed operation, it becomes possible to provide an advanced control reference (i.e., 110 degrees BTDC) which is much more advanced in the crank angle or position than a conventional control reference which is generally set to be at 75 degrees BTDC, whereby various engine control timings such as the timing for starting the power supply to an ignition coil, the ignition timing or the timing for cutting off the power supply and the like can be sufficiently and properly advanced as required for the high-speed engine operation. Accordingly, reference crank positions for controlling the operating condition of the engine can be properly set within practical control ranges as needed irrespective of the maximum limit of the reference control position. This results in stable engine control.

Figure 3:
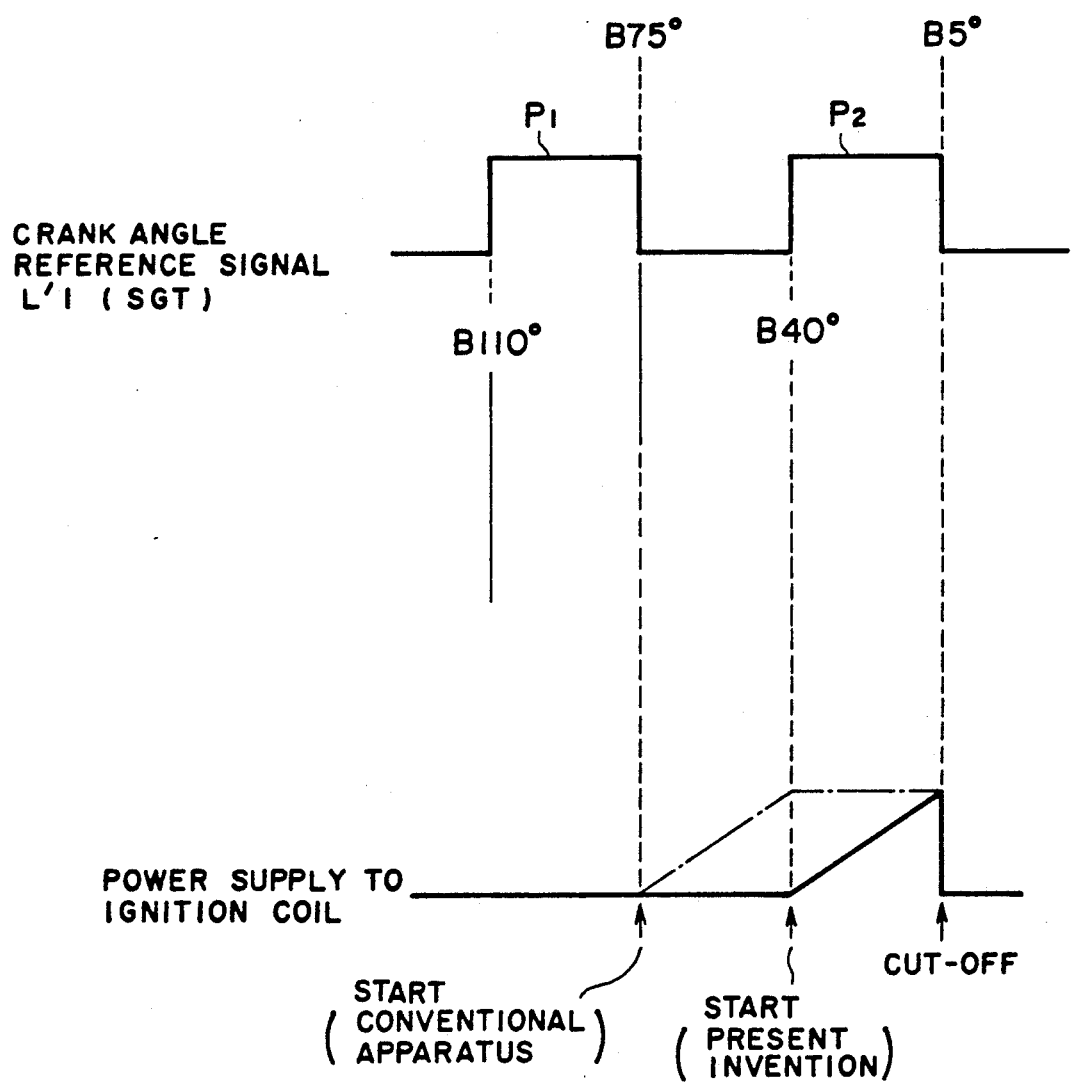
FIG. 3 is a timing chart illustrating the operation of an engine control apparatus equipped with the signal generator of FIG. 1, for controlling the power supply to an ignition coil.

Further, during initial ignition periods upon engine starting, the control unit in the form of a microcomputer can not often function properly due to, for example, temporary voltage drops in the battery when energizing the engine starter and the like. In this situation, bypass ignition control is performed based on second pulses $P_2$ in the crank angle reference signal $L'_1$. That is, as shown in FIG. 3, the power supply to the unillustrated ignition coil is started at the rising edge of a second pulse $P_2$, i.e., at a crank angle of 40 degrees BTDC, and cut off at the falling edge of the second pulse $P_2$, i.e., at a crank angle of 5 degrees BTDC. As a result, the duty cycle during the bypass ignition periods is reduced as compared with a conventional system in which the power supply to the ignition coil is started at the falling edge of a first pulse $P_1$ of the crank angle reference signal $L'_1$, e.g., at 75 degrees BTDC as shown by a dashed line in FIG. 3. Accordingly, the amount of current supplied to the ignition coil is substantially decreased, alleviating thermal load on power elements of the ignition apparatus and thus preventing thermal destruction thereof. Consequently, there is no need to provide a heat absorbing or dissipating means such as a heat tank.

Further, although in this case, the conduction period of the ignition coil in which power is supplied thereto is shortened to a crank angle range from 40 degrees BTDC to 5 degrees BTDC, a sufficient length of conduction time for proper ignition is obtained since the rotational speed of the crankshaft is low during the early stage of engine starting.

Figure 4:
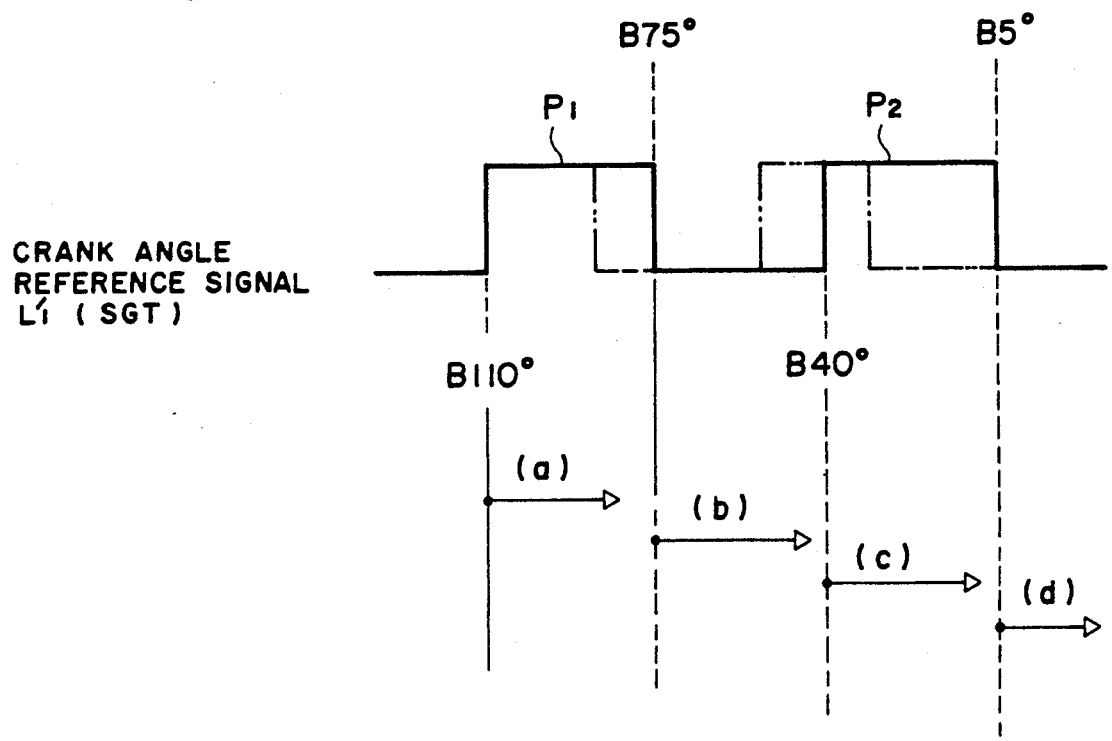
FIG. 4 is a timing chart illustrating the operation of an engine control apparatus equipped with the signal generator of FIG. 1, for changing the reference position for engine control in accordance with different control timing ranges.
Figure 7:
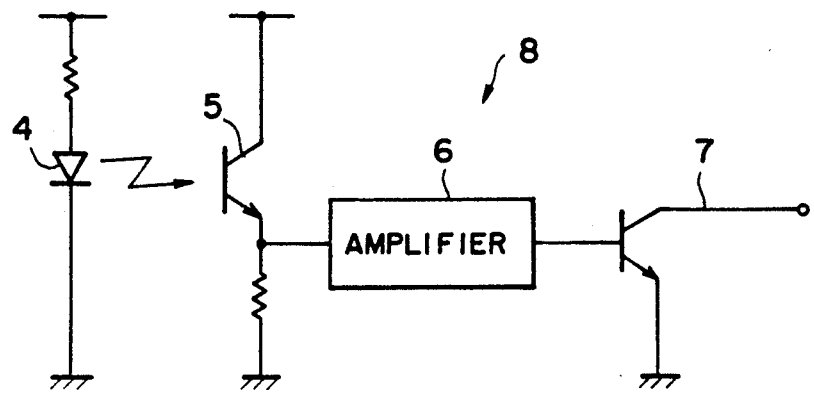
FIG. 7 is a schematic circuit diagram of the conventional signal generator of FIG. 6.
Figure 8:
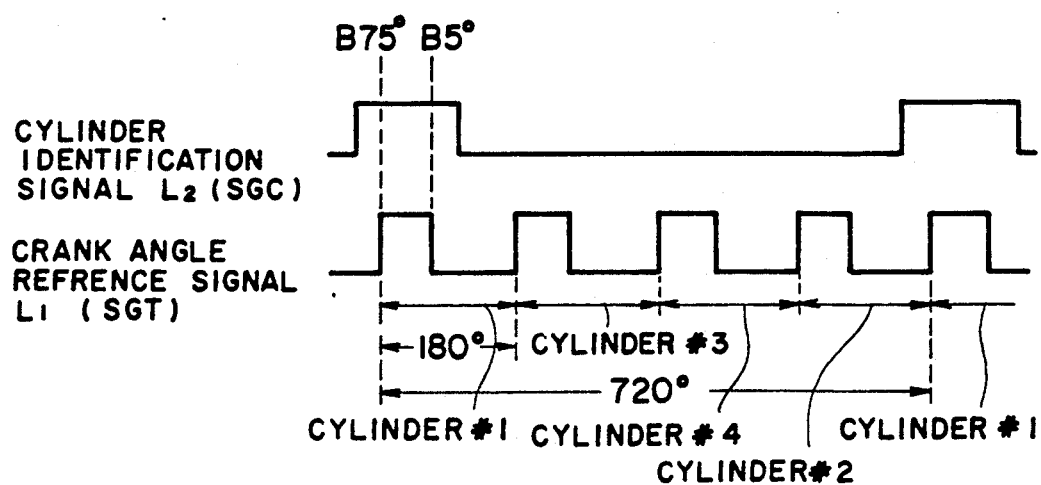
FIG. 8 is a waveform diagram showing the waveforms of the output signals of the conventional signal generator of FIG. 6.

Next, another example of engine control in which the reference position or crank angle for engine control is changed in accordance with different control timings will be described below with reference to FIG. 4. In this example, a reference crank position corresponding to one of the rising and falling edges of first and second pulses $P_1$, $P_2$, which is the nearest to a control timing, is set as a reference control position. The control timing may be a timing for controlling any kind of engine operation such as starting and cutting off the power supply to an ignition coil, starting and terminating fuel injection, etc. For example, as shown in FIG. 4, for a first range (a) of the control timing from 110 degrees BTDC to 75 degrees BTDC of an operating cycle of a cylinder, the rising edge of a first pulse $P_1$ for the cylinder is taken as a reference position; for a second range (b) from 75 degrees BTDC to 40 degrees BTDC of the cylinder cycle, the falling edge of the first pulse $P_1$ for the cylinder is taken as a reference position; for a third range (c) from 45 degrees BTDC to 5 degrees BTDC of the cylinder cycle, the rising edge of a second pulse $P_2$ for the cylinder is taken as a reference position; and for a fourth range (d) from 5 degrees BTDC of the cylinder cycle to 110 degrees BTDC of the following operating cycle of the cylinder, the falling edge of the second pulse $P_2$ is taken as a reference position. With this timing control, even if the pulse width of the first and second pulses $P_1$, $P_2$ of the crank angle reference signal $L'_1$ varies during transitional periods of the engine operation such as acceleration, deceleration, etc., there will be no practical adverse effects on the engine control since the time span or interval between the reference position and the control timing can be set much shorter with the present invention than that with the conventional apparatus utilizing the conventional signal generator 8 as illustrated in FIGS. 7 and 8. Thus, if ignition should take place at a crank position between 40 degrees BTDC and 5 degrees BTDC for example, the rising edge of a second pulse $P_2$ (i.e., 40 degrees BTDC), which is the nearest to the iginition point in time, is taken as a reference position so that a timer is operated at the rising edge of a second pulse $P_2$ to cut off the power supply to an unillustrated ignition coil for causing ignition after a predetermined time has elapsed from the rising edge of the second pulse $P_2$. In contrast, with the conventional engine control apparatus as referred to before, however, a timer is operated at the rising edge of a pulse of the crank angle reference signal $L'_2$ (i.e., at 75 degrees BTDC) to cut off the power supply after the lapse of a predetermined time as measured from 40 degrees BTDC which is much longer than that with the present invention. In this case, if the pulse width of each pulse of the crank angle reference signal $L'_1$ changes or reduces upon a sudden engine acceleration, as shown in the phantom line in FIG. 3, the prescribed ignition timing will be retarded to a much greater extent with the conventional apparatus than with the present invention, i.e., retarded by a time corresponding to an interval between 75 degrees BTDC and 40 degrees BTDC due to such an acceleration.

Although in the above description, the rising and falling edges of first and second pulses $P_1$, $P_2$ of the crank angle reference signal $L'_1$ (i.e., the leading and trailing edges of the first and second slots 103a, 103b of the signal generator 108) are set to be at 110 degrees BTDC, 75 degrees BTDC, 40 degrees BTDC and 5 degrees BTDC, respectively, they can of course be set at any arbitrary crank angle as necessary.

Further, although in the above description, the crank angle reference signal $L'_2$ contains two rectangular pulses $P_1$, $P_2$ for each ignition cycle of a cylinder, it may of course contain three or more pulses as necessary.

It should be noted that the present invention is not limited to controlling the power supply to the ignition coil, but is likewise applicable to other engine control operations such as fuel injection, etc.

What is claimed is:

1. A signal generator for use with an engine control apparatus generating a crank angle reference signal containing a plurality of pulses for each operation cycle of each cylinder in synchrony with the rotation of the engine, each of the pulses in a group having a rising edge and a falling edge which can be used as predetermined reference crank positions of a corresponding cylinder for controlling the operation of the engine.

2. A signal generator according to claim 1, further generating a cylinder identification signal in synchrony with the rotation of the engine for identifying the operating states of the cylinders.

3. A signal generator for use with an engine control apparatus comprising:
   a rotating shaft being rotatable in synchrony with the rotation of an engine;
   a rotating disk fixedly mounted on the rotating shaft and having a plurality of groups of slits formed therein, the slits in a group being for a corresponding one of the cylinders and being disposed on a circle around the axis of the rotating shaft, each of the slits in a group having a leading edge and a trailing edge corresponding to prescribed crank positions of a corresponding one of the cylinders; and
   a photocoupler disposed near the rotating disk for generating an output signal when it senses that one of the slits in the rotating disk passes a prescribed location during the rotation of the rotating disk.

4. A signal generator according to claim 3, wherein each group of the slits comprises at least a first slit and a second slit disposed on a single circle around the axis of the rotating shaft, the first slits having substantially the same circumferential length and being circumferentially spaced from each other at substantially the same intervals, the second slits being disposed near the corresponding first slits and having substantially the same circumferential length and being circumferentially spaced from each other at substantially the same intervals.

5. A signal generator according to claim 4 comprising:

at least one third slit corresponding to at least one of the cylinders and disposed near a corresponding group of the first and second slits; and a second photocoupler disposed near the rotating disk for generating an output signal when it senses that the at least one third slit in the rotating disk passes a prescribed location during the rotation of the rotating disk.

6. A signal generator according to claim 5, wherein the at least one third slit is disposed on a circle different from the one on which the first and second slits are disposed.

7. A control apparatus for a an internal combustion engine comprising:

a signal generator for generating a crank angle reference signal containing a plurality of pulses for each operation cycle of each cylinder in synchrony with the rotation of the engine, each of the pulses in a group having a rising edge and a falling edge which correspond to predetermined reference crank positions of a corresponding cylinder; and a control unit for controlling the operation of the engine based on the crank angle reference signal of the signal generator in such a manner that it controls the engine based on some of the rising and falling edges of the pulses in each group in one operating condition of the engine, and based on another of the rising and falling edges of the pulses in each group in another operating condition of the engine.

8. A control apparatus according to claim 7, wherein the signal generator further generates a cylinder identification signal in synchrony with the rotation of the engine, and the control unit identifies the operating states of the cylinders based on the cylinder identification signal, and controls the engine based on the crank angle reference signal in the above manner after the cylinder identification has been performed.

9. A control apparatus for an internal combustion engine comprising:

a signal generator for generating a crank angle reference signal containing a plurality of pulses for each operation cycle of each cylinder in synchrony with the rotation of the engine, each of the pulses in a group having a rising edge and a falling edge which correspond to predetermined reference crank positions of a corresponding cylinder; and a control unit for controlling the operation of the engine based on the crank angle reference signal of the signal generator in such a manner that at least one of the rising and falling edges of the pulses in a group is set as a reference control position in accordance with different timing control ranges.

10. A control apparatus for an internal combustion engine according to claim 9, wherein the at least one of the rising and falling edges of the pulses set as a reference control position is the nearest to a control timing at which control of the engine is performed.

* * * * *